US012608837B2

(12) United States Patent
Lee

(10) Patent No.: US 12,608,837 B2
(45) Date of Patent: Apr. 21, 2026

(54) METHOD OF POSE TRACKING AND DEVICE USING THE SAME

(71) Applicant: HTC Corporation, Taoyuan City (TW)

(72) Inventor: Yen-Jung Lee, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 442 days.

(21) Appl. No.: 18/466,827

(22) Filed: Sep. 14, 2023

(65) Prior Publication Data

US 2025/0095184 A1     Mar. 20, 2025

(51) Int. Cl.
G06T 7/70 (2017.01)
G06T 17/05 (2011.01)

(52) U.S. Cl.
CPC ............... G06T 7/70 (2017.01); G06T 17/05 (2013.01); G06T 2207/10016 (2013.01)

(58) Field of Classification Search
CPC . G06T 7/70; G06T 17/05; G06T 2207/10016; G06F 3/011; G06F 16/27; G06F 16/29; G06F 2203/012
See application file for complete search history.

(56) References Cited

U.S. PATENT DOCUMENTS

| | | | | | |
|---|---|---|---|---|---|
| 11,711,668 | B2 * | 7/2023 | Reinhardt | .............. | H04W 4/026 |
| | | | | | 455/456.1 |
| 12,299,183 | B1 * | 5/2025 | Satpathy | .................. | G06F 21/31 |
| 12,299,835 | B1 * | 5/2025 | Lyu | ........................... | G06T 7/70 |
| 12,462,153 | B2 * | 11/2025 | Schneider | .............. | G06N 3/084 |

| | | | | | |
|---|---|---|---|---|---|
| 12,462,394 | B2 * | 11/2025 | Spizhevoy | .......... | G06F 18/2413 |
| 2017/0345220 | A1 * | 11/2017 | Bates | .................... | H04N 13/383 |
| 2018/0096519 | A1 * | 4/2018 | Tokubo | .................... | A63F 13/56 |
| 2018/0132116 | A1 * | 5/2018 | Shekhar | .............. | H04W 64/006 |
| 2018/0300897 | A1 * | 10/2018 | Woods | .................. | G06F 3/0481 |
| 2019/0361518 | A1 * | 11/2019 | Vakrat | .................... | G06F 3/012 |
| 2020/0042278 | A1 * | 2/2020 | Eade | .................... | G02B 27/017 |
| 2020/0082626 | A1 * | 3/2020 | Guo | .......................... | G06T 7/74 |

(Continued)

FOREIGN PATENT DOCUMENTS

| | | | | |
|---|---|---|---|---|
| TW | 202127105 | | 7/2021 | |
| TW | 202303527 | | 1/2023 | |
| WO | WO-2021088498 A1 * | | 5/2021 | ............. G06V 20/20 |

OTHER PUBLICATIONS

Interaction and visualisation across multiple displays in ubiquitous computing environments. Slay et al. AFRIGRAPH '06: Proceedings of the 4th international conference on Computer graphics, virtual reality, visualisation and interaction in Africa; pp. 75-84 (Year: 2006).*

(Continued)

*Primary Examiner* — Delomia L Gilliard
(74) *Attorney, Agent, or Firm* — JCIPRNET

(57) ABSTRACT

A method of pose tracking, a method of generating a stable key frame for pose tracking, a portable device, and a head-mounted display are provided. The method of pose tracking includes: receiving a stable key frame from the head-mounted display; receiving map data from the head-mounted display; determining whether the stable key frame is available according to information, wherein the information is obtained from the head-mounted display; and in response to the stable key frame being available, updating a map for the pose tracking according to the stable key frame and the map data.

17 Claims, 5 Drawing Sheets

(56)             References Cited

U.S. PATENT DOCUMENTS

| | | | |
|---|---|---|---|
| 2021/0110614 A1* | 4/2021 | Shahrokni ............. | G06T 19/006 |
| 2021/0152643 A1* | 5/2021 | Mathur ................. | H04L 67/141 |
| 2021/0183343 A1* | 6/2021 | Beith .................. | G02B 27/0172 |
| 2021/0256768 A1* | 8/2021 | Zhao ........................ | H04W 4/02 |
| 2022/0058871 A1* | 2/2022 | Cheng ........................ | G06T 7/55 |
| 2022/0253126 A1* | 8/2022 | Holland ................. | G06F 3/011 |
| 2022/0412741 A1* | 12/2022 | Wakabayashi ....... | G01C 21/206 |
| 2023/0095621 A1* | 3/2023 | Gorur Sheshagiri .. | G06V 20/46 |
| | | | 382/103 |
| 2023/0258756 A1* | 8/2023 | Brown .............. | H04B 1/71635 |
| | | | 345/633 |
| 2023/0336873 A1* | 10/2023 | Shi ..................... | H04N 23/6812 |
| 2024/0007760 A1* | 1/2024 | Holland .............. | H04N 23/951 |
| 2024/0046583 A1* | 2/2024 | Xiong ........................ | G06T 7/73 |
| 2024/0078774 A1* | 3/2024 | Park ................... | G01C 21/206 |
| 2024/0094907 A1* | 3/2024 | Sharma .............. | G06F 12/0207 |
| 2024/0095376 A1* | 3/2024 | Satpathy .............. | G06F 21/554 |
| 2024/0353925 A1* | 10/2024 | Bagheri ................. | H04N 23/71 |
| 2025/0095184 A1* | 3/2025 | Lee .......................... | G06T 17/05 |
| 2025/0157192 A1* | 5/2025 | Tsuru ..................... | G06F 3/012 |

OTHER PUBLICATIONS

"Office Action of Taiwan Counterpart Application", issued on Dec. 13, 2024, p. 1-p. 4.

\* cited by examiner

Stable Key Frame

Key Frame

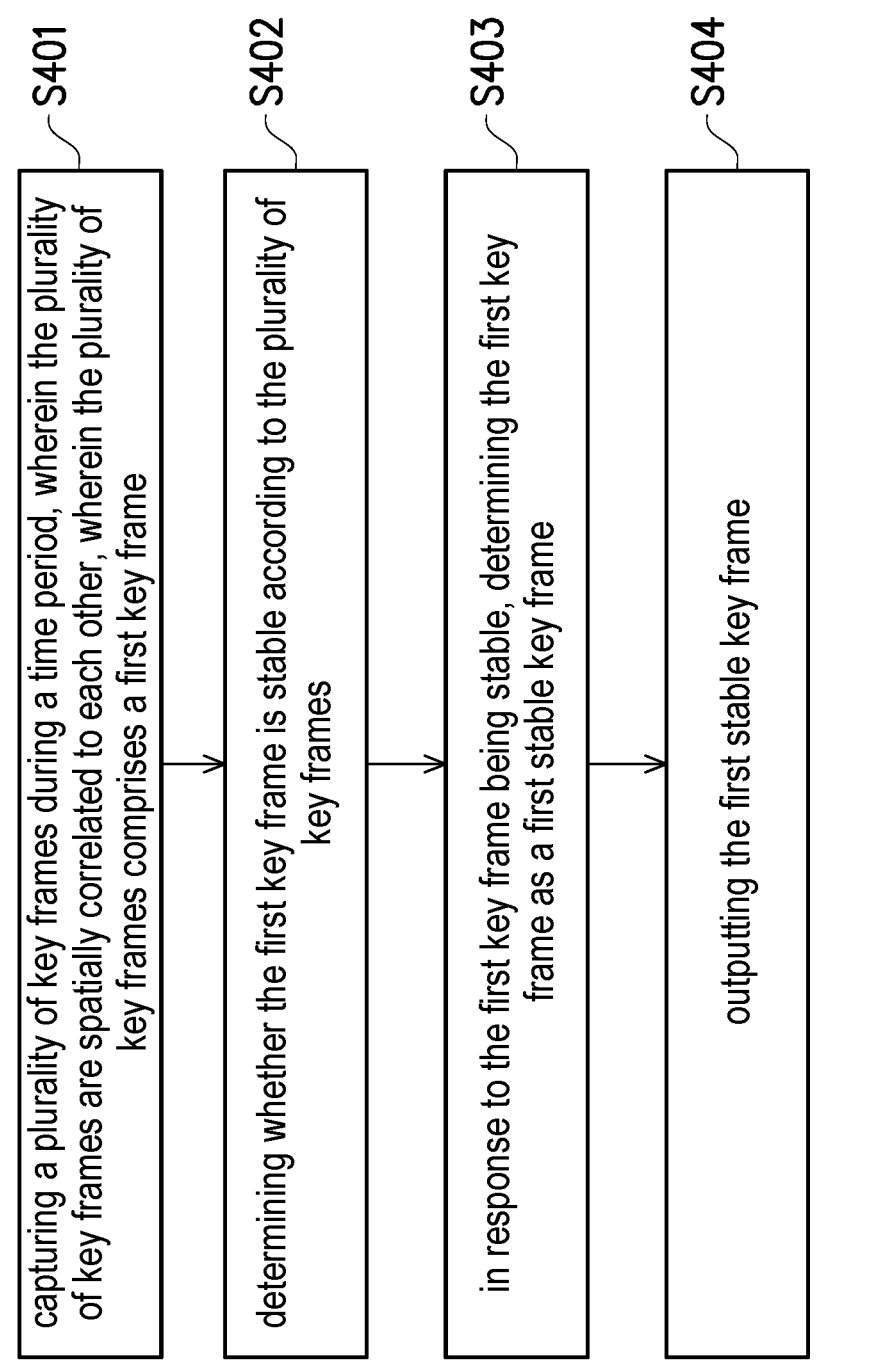

S401 capturing a plurality of key frames during a time period, wherein the plurality of key frames are spatially correlated to each other, wherein the plurality of key frames comprises a first key frame

S402 determining whether the first key frame is stable according to the plurality of key frames

S403 in response to the first key frame being stable, determining the first key frame as a first stable key frame

S404 outputting the first stable key frame

FIG. 4

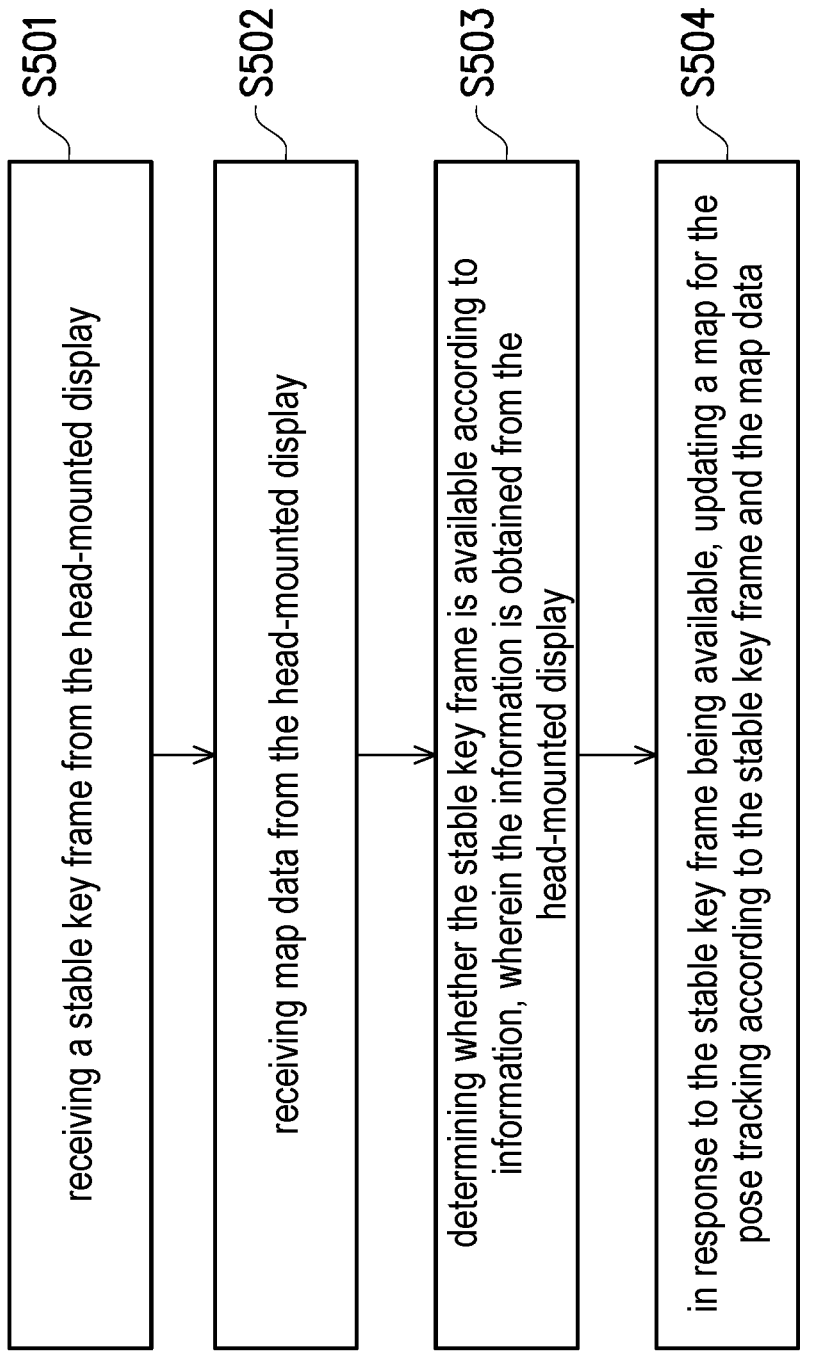

S501 receiving a stable key frame from the head-mounted display

S502 receiving map data from the head-mounted display

S503 determining whether the stable key frame is available according to information, wherein the information is obtained from the head-mounted display S504 in response to the stable key frame being available, updating a map for the pose tracking according to the stable key frame and the map data

FIG. 5

METHOD OF POSE TRACKING AND DEVICE USING THE SAME

BACKGROUND

Technical Field

The disclosure relates to extended reality (XR) technology, and particularly relates to a method of pose tracking, a method of generating a stable key frame for pose tracking, a portable device, and a head-mounted display (HMD).

Description of Related Art

To interact with a XR scene provided by an HMD, a user may operate a portable device (also known as a "tracker") capable of performing map synchronization with the HMD. According to the current methods, the tracker may receive map from the HMD and then reuses the map for tracking. However, the current methods have some disadvantages such as: the tracker has to wait until transmission completes before reusing the map for relocalization or tracking; if the environment changes little, it is not efficient to wait for transmission every time the tracker connects to the HMD; the HMD may have created a new map and thus the map saved by the tracker is outdated; map data synchronization may hinder tracking on the tracker if lots of outdated map data are removed quickly; there could be large pose drift if the difference between the HMD's map and the map saved by the tracker is large; and it may take a long time for the tracker to load a large map.

SUMMARY

The present invention is directed to a method of pose tracking, a method of generating a stable key frame for pose tracking, a portable device, and a HMD.

The present invention is directed to a method of pose tracking, adapted to a portable device communicatively connected to a head-mounted display, including: receiving a stable key frame from the head-mounted display; receiving map data from the head-mounted display; determining whether the stable key frame is available according to information, wherein the information is obtained from the head-mounted display; and in response to the stable key frame being available, updating a map for the pose tracking according to the stable key frame and the map data.

In one embodiment of the present invention, the information includes a time duration since a last connection between the portable device and the head-mounted display was established, and the step of determining whether the stable key frame is available according to the information includes: determining whether the time duration is less than a threshold; and in response to the time duration being less than the threshold, determining the stable key frame is available.

In one embodiment of the present invention, the information further includes a power off record of the head-mounted display, and the step of determining whether the stable key frame is available according to the information further includes: determining whether the head-mounted display is powered off during the time duration according to the power off record; and in response to the head-mounted display not being powered off during the time duration, determining the stable key frame is available.

In one embodiment of the present invention, the information further includes a first map identification, and the step of determining whether the stable key frame is available according to the information further includes: determining whether the first map identification matches a second map identification of the map; and in response to the first map identification matching the second map identification, determining the stable key frame is available.

In one embodiment of the present invention, the method further including: in response to the stable key frame being not available, updating the map without using the stable key frame.

In one embodiment of the present invention, the step of updating the map for the pose tracking according to the stable key frame and the map data includes: performing a relocalization according to the stable key frame and the map data and determining whether the relocalization is successful; and in response to the relocalization been successful, updating the map according to the stable key frame and the map data.

In one embodiment of the present invention, the step of determining whether the relocalization is successful includes: obtaining a pose drift between the stable key frame and a current key frame included in the map data, wherein the current key frame is corresponded to the stable key frame; determining whether the pose drift is less than a threshold; and in response to the pose drift being less than the threshold, determining the relocalization is successful.

In one embodiment of the present invention, the step of updating the map for the pose tracking according to the stable key frame and the map data includes: updating the map based on simultaneous localization and mapping (SLAM) algorithm.

In one embodiment of the present invention, the portable device includes at least one of an accelerometer and an image capture device.

The present invention is directed to a method of generating a stable key frame for pose tracking, adapted to a head-mounted display, including: capturing a plurality of key frames during a time period, wherein the plurality of key frames are spatially correlated to each other, wherein the plurality of key frames includes a first key frame; determining whether the first key frame is stable according to the plurality of key frames; in response to the first key frame being stable, determining the first key frame as a first stable key frame; and outputting the first stable key frame.

In one embodiment of the present invention, the plurality of key frames further includes a second key frame, and the step of determining whether the first key frame is stable according to the plurality of key frames includes: capturing a plurality of first features from the first key frame and capturing a plurality of second features from the second key frame; detecting a plurality of matching features among the plurality of first features and the plurality of second features; and in response to a number of the plurality of matching features being greater than a threshold, determining the second key frame is similar with the first key frame.

In one embodiment of the present invention, the step of determining whether the first key frame is stable according to the plurality of key frames includes: in response to a number of key frames similar with the first key frame in the plurality of key frames being greater than a threshold, determining the first key frame is stable.

In one embodiment of the present invention, the step of determining the first key frame as the first stable key frame includes: in response to a lifespan of the first key frame being greater than a threshold, determining the first key frame as the first stable key frame.

In one embodiment of the present invention, the method further including: obtaining a plurality of neighboring key frames of the first stable key frame; selecting a second key frame from the plurality of neighboring key frames based on a depth first search algorithm; determining whether the second key frame is stable; in response to the second key frame being stable, determining the second key frame as a second stable key frame; and outputting the second stable key frame.

In one embodiment of the present invention, the method further including: capturing a reference key frame; obtaining a plurality of neighboring key frames of the reference key frame; selecting the first key frame from the plurality of neighboring key frames based on a depth first search algorithm; and determining whether the first key frame is stable.

The present invention is directed to a portable device, including a transceiver and a processor. The transceiver communicatively connects to a head-mounted display. The processor is coupled to the transceiver, wherein the processor is configured to: receive a stable key frame from the head-mounted display; receive map data from the head-mounted display; determine whether the stable key frame is available according to information, wherein the information is obtained from the head-mounted display; and in response to the stable key frame being available, update a map for the pose tracking according to the stable key frame and the map data.

The present invention is directed to a head-mounted display, including a transceiver and a processor. The processor is coupled to the transceiver, wherein the processor is configured to: capture a plurality of key frames during a time period, wherein the plurality of key frames are spatially correlated to each other, wherein the plurality of key frames includes a first key frame; determine whether the first key frame is stable according to the plurality of key frames; in response to the first key frame being stable, determine the first key frame as a first stable key frame; and output the first stable key frame via the transceiver.

Based on the above description, the portable device of the present invention may reuse the saved map in order to enter six degrees of freedom (6-DoF) earlier if the environment changes little. The portable device may not reuse the saved map if the HMD's map changed too much. The portable device can keep tracking during map data synchronization. Accordingly, the pose drift between the HMD and the portable device may be reduced, and the map loading time for the portable device may be reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 illustrates a flowchart of a method of generating a stable key frame for pose tracking according to an embodiment of the present invention.

FIG. 5 illustrates a flowchart of a method of pose tracking according to an embodiment of the present invention.

DESCRIPTION OF THE EMBODIMENTS

Figure 1:
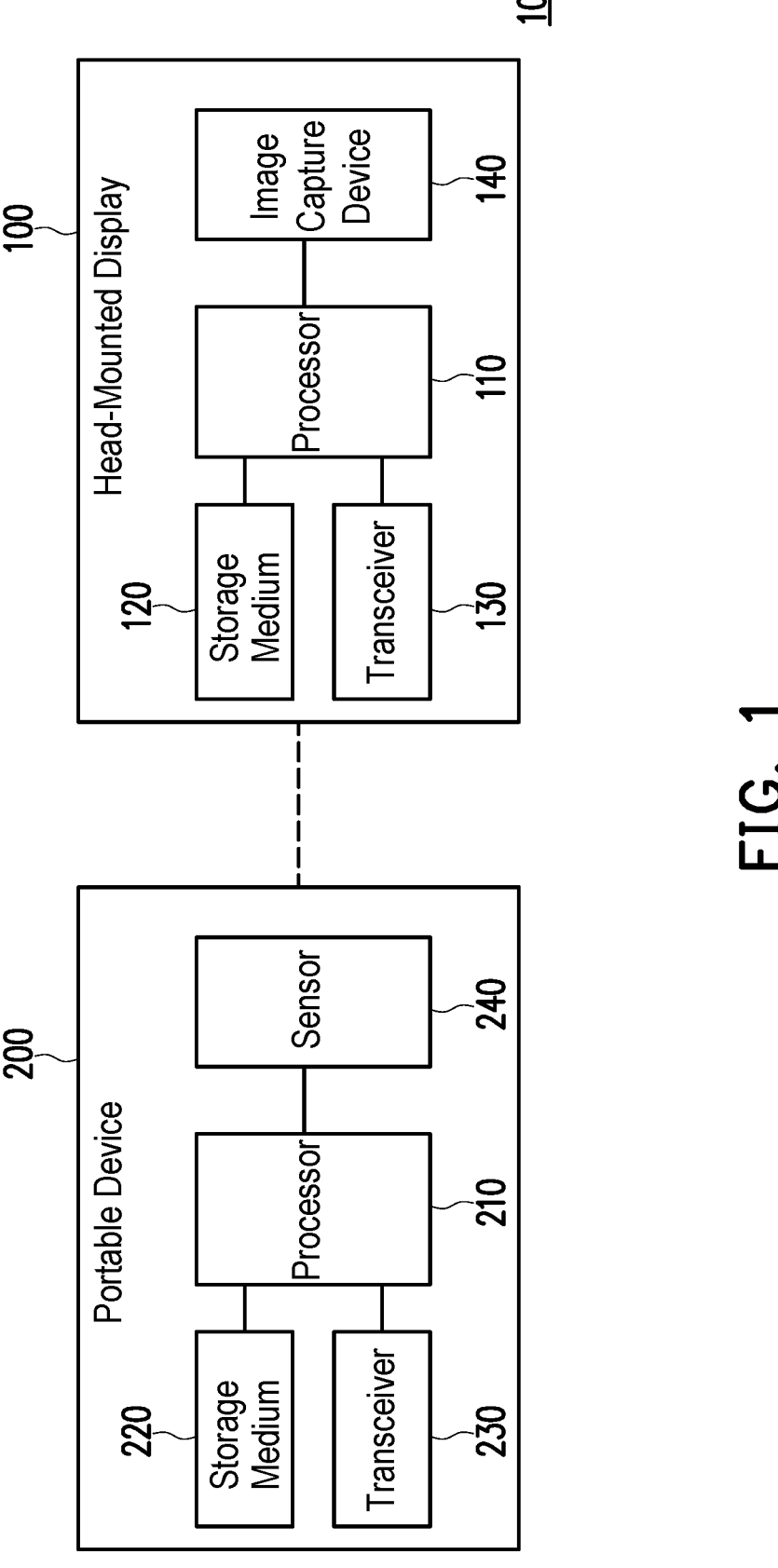
FIG. 1 illustrates a schematic diagram of an HMD system of pose tracking according to an embodiment of the present invention.

FIG. 1 illustrates a schematic diagram of an HMD system 10 of pose tracking according to an embodiment of the present invention, wherein the HMD system 10 may be implemented in an XR system (e.g., virtual reality (VR) system, augmented reality (AR) system, or mixed reality (MR) system). The HMD system 10 may include an HMD 100 and a portable device 200, wherein the portable device 200 may be, for example, a remote controller or a wireless controller of the HMD 100. The portable device 200 may communicatively connect to the HMD 100.

The HMD 100 may include a processor 110, a storage medium 120, a transceiver 130, and an image capture device 140. The processor 110 may be, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar device o a combination of the above devices. The processor 110 may be coupled to the storage medium 120, the transceiver 130, and the image capture device 140.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The transceiver 130 may be configured to transmit or receive wired or wireless signals. The transceiver 130 may also perform operations such as low noise amplifying, impedance matching, frequency mixing, up or down frequency conversion, filtering, amplifying, and so forth. The HMD 100 may communicate with the portable device 200 via the transceiver 130.

The image capture device 140 may be a camera or a photographic device for capturing images. The image capture device 140 may include an image sensor such as a complementary metal oxide semiconductor (CMOS) sensor or a charge coupled device (CCD) sensor.

The portable device 200 may include a processor 210, a storage medium 220, a transceiver 230, and a sensor 240. The processor 210 may be, for example, a CPU or other programmable MCU for general purpose or special purpose, a microprocessor, a DSP, a programmable controller, an ASIC, a GPU, an ALU, a CPLD, a FPGA, or other similar device o a combination of the above devices. The processor 210 may be coupled to the storage medium 220, the transceiver 230, and the sensor 240.

The storage medium 220 may be, for example, any type of fixed or removable RAM, a ROM, a flash memory, a HDD, an SSD or similar element, or a combination thereof, configured to record a plurality of modules or various applications executable by the processor 210. The transceiver 230 may be configured to transmit or receive wired or wireless signals.

The transceiver 230 may also perform operations such as low noise amplifying, impedance matching, frequency mixing, up or down frequency conversion, filtering, amplifying, and so forth. The portable device 200 may communicate with the HMD 100 via the transceiver 230.

The sensor 240 may include but not limited to an accelerometer or an image capture device. The sensor 240 may generate sensed data (e.g., acceleration or image) for the pose tracking.

The HMD 100 may capture a plurality of images via the image capture device 140 and may generate map data according to the plurality of images, wherein the map data may be used for establishing a map. The map may be updated over time based on the new map data generate by the HMD 100. In one embodiment, the HMD 100 may establish or update the map based on simultaneous localization and mapping (SLAM) algorithm.

Figure 2:
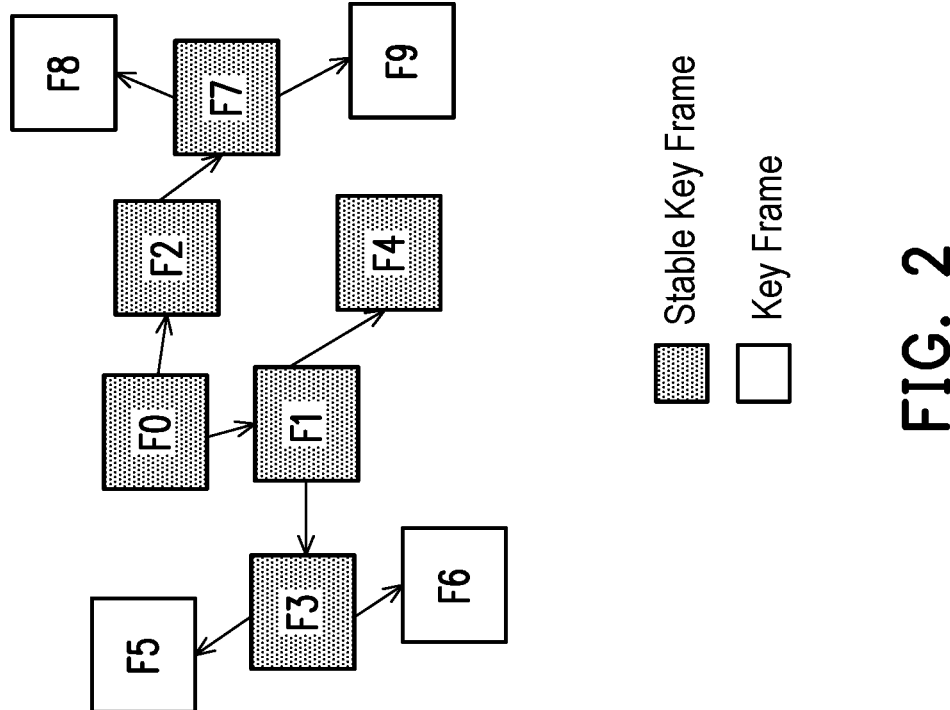
FIG. 2 illustrates a schematic diagram of a tree structure of key frames according to an embodiment of the present invention.

The HMD 100 may generate one or more stable key frames for pose tracking. The HMD 100 may generate a stable key frame according to a tree structure of key frames obtained by the HMD 100. FIG. 2 illustrates a schematic diagram of a tree structure of key frames according to an embodiment of the present invention, wherein the tree structure may consist of key frames F0, F1, F2, F3, F4, F5, F6, F7, F8, and F9, but the present invention is not limited thereto. The key frames may be defined as node of the tree structure and the relationships among the key frames. Two key frames connected by an arrow may be considered as neighboring key frames, wherein the arrow may include information such as weight between the two key frames (e.g., the higher the weight, the higher the similarity between the two key frames). For example, key frame F1 may be considered as a neighboring key frame of key frame F0. In one embodiment, the tree structure in FIG. 2 may be generated by the HMD 100 based on depth first search algorithm.

In one embodiment, the HMD 100 may define a first key frame obtained by the HMD 100 as a reference key frame, wherein the reference key frame may be defined as a stable key frame automatically. For example, the HMD 100 may define key frame F0 as the reference key frame. The HMD 100 may obtain one or more neighboring key frames (e.g., key frame F1 or F2) of the reference key frame F0. Then, the HMD 100 may determine whether a neighboring key frame of the reference key frame F0 is a stable key frame or not. If the neighboring key frames of the reference key frame F0 is greater than one, the HMD 100 may select one of the neighboring key frames of the reference key frame F0 based on, for example, depth first search (DFS) algorithm. The HMD 100 may determine whether the selected neighboring key frame is a stable key frame at an earlier time point, and may determine whether the non-selected neighboring key frame is a stable key frame at a later time point. For example, the HMD 100 may select key frame F1 from the neighboring key frames of the reference key frame F0 based on DFS algorithm. Accordingly, the HMD 100 may determine whether key frame F1 is a stable key frame at an earlier time point, and may determine whether key frame F2 is a stable key frame at a later time point.

The HMD 100 may determine whether key frame F1 is a stable key frame according to the stability and lifespan of the key frame F1. If the key frame F1 is stable and/or has a long lifespan, the HMD 100 may determine that the key frame F1 may be a stable key frame. Otherwise, the HMD 100 may consider the key frame F1 as a normal key frame. The HMD 100 may output one or more stable key frames to the portable device 200 via the transceiver 130.

Specifically, the HMD 100 may capture a plurality of key frames (including key frame F1) during a time period, wherein the plurality of key frames may be spatially correlated to each other (i.e., these key frames are key frames at different times in the same space). In one embodiment, the plurality of key frames may include one or more historical stable key frames (i.e., key frames for updating past maps) The HMD 100 may determine whether the key frame F1 in the plurality of key frames is stable according to the plurality of key frames.

In one embodiment, the HMD 100 may capture a plurality of features from key frame F1 and capture a plurality of features from a specific key frame in the plurality of key frames, wherein the plurality of key frames (including key frame F1) may be spatially correlated to each other. The HMD 100 may detect a plurality of matching features among the plurality of features of the key frame F1 and the plurality of features of the specific key frame. If the number of the plurality of matching features is greater than a threshold, the HMD 100 may determine that the specific key frame is similar with the key frame F1. If the number of the key frames (or number of the historical stable key frames) similar with the key frame F1 in the plurality of key frames is greater than a threshold period, the HMD 100 may determine that the key frame F1 is stable.

In one embodiment, the HMD 100 may determine the key frame F1 is stable according to the bundle adjustment (BA) times of the key frame F1. Specifically, the HMD 100 may perform enough times of BA (i.e., BA times being greater than a threshold) on the key frame F1 to obtain a pose drift (or reprojection error) of the key frame F1. If the pose drift is less than a threshold, the HMD 100 may determine that the key frame F1 is stable.

In one embodiment, the HMD 100 may determine that the key frame F1 is a stable key frame if the lifespan of the key frame F1 (i.e., time period since key frame F1 was created or captured by the HMD 100) is greater than a threshold.

If the HMD 100 determines that the key frame F1 is not a stable key frame, the HMD 100 may stop searching the neighboring key frames of the key frame F1, and may determine whether the other neighboring key frame (e.g., key frame F2) of the reference key frame F0 is a stable key frame. On the other hand, if the HMD 100 determines that the key frame F1 is a stable key frame, the HMD 100 may select one of the neighboring key frames of the key frame F1 (e.g., key frame F3 or F4) based on, for example, DFS algorithm. After that, the HMD 100 may determine whether the selected key frame is a stable key frame. If the selected key frame is stable and/or has a long lifespan, the HMD 100 may determine that the selected key frame is a stable key frame. Otherwise, the HMD 100 may consider the selected key frame as a normal key frame.

For example, in FIG. 2, the HMD 100 may determine that key frames F0, F1, F2, F3, F4, and F7 are stable key frames, and may determine that key frames F5, F6, F8, and F9 are normal key frames. Since key frames F5, F6, F8, and F9 are not stable key frames, the HMD 100 may stop searching for the neighboring key frames of the key frames F5, F6, F8, or F9. After the stable key frames are determined, the HMD 100 may transmit the stable key frames to the portable device 200 via the transceiver 130.

Figure 3:
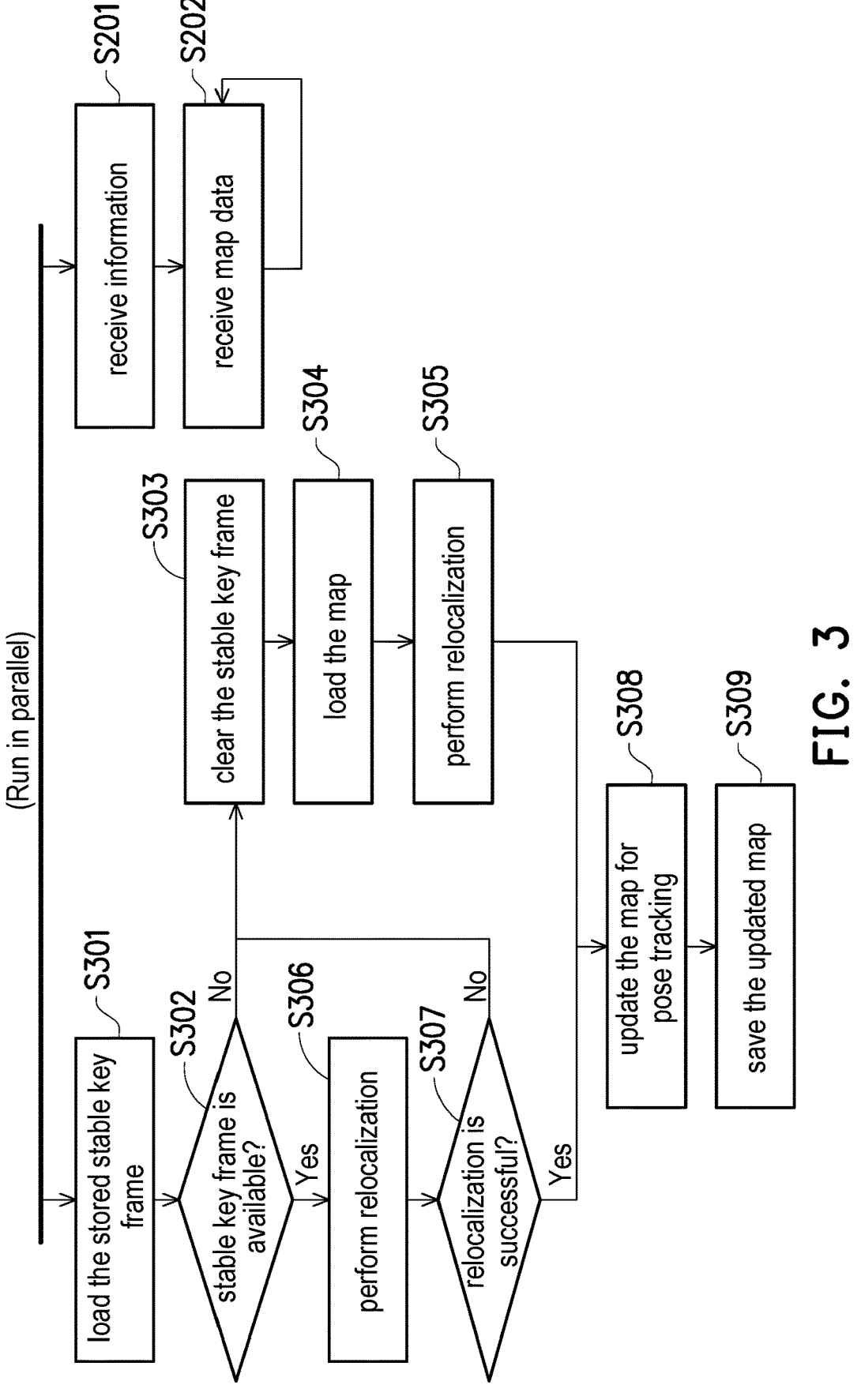
FIG. 3 illustrates a flowchart of a method of pose tracking according to an embodiment of the present invention.

The portable device 200 may receive one or more stable key frames from the HMD 100 via the transceiver 230. The portable device 200 may store the stable key frame in the storage medium 200 and may perform pose tracking according to the stable key frame. FIG. 3 illustrates a flowchart of a method of pose tracking according to an embodiment of the present invention, wherein the method of FIG. 3 may be implemented by the portable device 200 as shown in FIG. 1.

In step S201, the portable device 200 may receive information from the HMD 100 via the transceiver 230, wherein the information may indicate whether the stable key frame stored in the storage medium 220 is available. In step S202, the portable device 200 may keep receiving map data from the HMD 100 via the transceiver 230. In one embodiment, the portable device 200 may receive a completed map created by the HMD 100 from the HMD 100. The data received from the HMD 100 may be stored in the storage medium 220 by the portable device 200.

In step S301, the portable device 200 may load the stored stable key frame from the storage medium 120. In step S302, the portable device 200 may determine whether the stable key frame is available. If the stable key frame is available, proceeding to the step S306. If the stable key frame is not available, proceeding to the step S303.

The portable device 200 may determine whether the stable key frame is available according to the information received from the HMD 100. In one embodiment, the information may include a time duration since the last connection between the portable device 200 and the HMD 100 was established. If the time duration is less than a threshold, the portable device 200 may determine that the stable key frame is available. If the time duration is greater than or equal to the threshold, the portable device 200 may determine that the stable key frame is not available. That is, the portable device 200 may determine that the stable key frame is not available if the portable device 200 is not communicatively connected to the HMD 100 for a long time.

In one embodiment, the information may include a power off record of the HMD 100. The portable device 200 may determine whether the HMD 100 has ever been powered off during a time duration (e.g., time duration since the last connection between the portable device 200 and the HMD 100 was established) according to the power off record. If the HMD 100 has been powered off during the time duration, the portable device 200 may determine that the stable key frame is not available. If the HMD 100 has never been powered off during the time duration, the portable device 200 may determine that the stable key frame is available.

In one embodiment, the information may include a map identification, wherein the map identification belongs to a map corresponding to a specific space. Since the HMD 100 may create different maps for the different spaces, the different map identifications may correspond to different spaces respectively. The portable device 200 may determine that whether the map identification in the information matches the map identification corresponding to the map (e.g., a map be created and updated by the portable device 200) currently been used by the portable device 200. If the map identification in the information matches the map identification corresponding to the map currently been used by the portable device 200, the portable device 200 may determine that the HMD 100 stays in the same space. Accordingly, the portable device 200 may determine that the stable key frame is available. If the map identification in the information not matches the map identification corresponding to the map currently been used by the portable device 200, the portable device 200 may determine that the HMD 100 moves to another space. Accordingly, the portable device 200 may determine that the stable key frame is not available.

In step S303, the portable device 200 may clear the stable key frame stored in the storage medium 220. In step S304, the portable device 200 may load the received map. In step S305, the portable device 200 may perform relocalization according to the received map.

In step S306, the portable device 200 may perform a relocalization according to the stable key frame and the map data. After that, in step S307, the portable device 200 may determine whether the relocalization is successful. If the relocalization is successful, proceeding to step S308. If the relocalization is not successful, proceeding to step S303.

In one embodiment, the portable device 200 may determine whether the relocalization is successful or not according to the available stable key frame and a current key frame included in the map data, wherein the current key frame is corresponded to the available stable key frame (e.g., the current key frame and the available stable key frame are spatially correlated to each other). Specifically, the portable device 200 may obtain a pose drift between the stable key frame and the current key frame. If the pose drift between the stable key frame and the current key frame is less than a threshold, the portable device 200 may determine that the relocalization is successful. If the pose drift between the stable key frame and the current key frame is greater than or equal to the threshold, the portable device 200 may determine that the relocalization is not successful.

In step S308, the portable device 200 may update the map for pose tracking according to the map data. The portable device 200 may update the map based on SLAM algorithm. In one embodiment, the portable device 200 may update the map for the pose tracking according to the map data and the stable key frame if the stable key frame is available. In one embodiment, the portable device 200 may update the map for the pose tracking according to the map data without the stable key frame if the stable key frame is not available.

In step S309, the portable 200 may save the updated map in the storage medium 220.

FIG. 4 illustrates a flowchart of a method of generating a stable key frame for pose tracking according to an embodiment of the present invention, wherein the method in FIG. 4 may be implemented by the HMD 100 as shown in FIG. 1. In step S401, capturing a plurality of key frames during a time period, wherein the plurality of key frames are spatially correlated to each other, wherein the plurality of key frames comprises a first key frame. In step S402, determining whether the first key frame is stable according to the plurality of key frames. In step S403, in response to the first key frame being stable, determining the first key frame as a first stable key frame. In step S404, outputting the first stable key frame.

FIG. 5 illustrates a flowchart of a method of pose tracking according to an embodiment of the present invention, wherein the method in FIG. 5 may be implemented by the portable device 200 as shown in FIG. 1. In step S501, receiving a stable key frame from the head-mounted display. In step S502, receiving map data from the head-mounted display. In step S503, determining whether the stable key frame is available according to information, wherein the information is obtained from the head-mounted display. In step S504, in response to the stable key frame being available, updating a map for the pose tracking according to the stable key frame and the map data.

In summary, the HMD of the present invention may determine stable key frames from the obtained key frames according to the stability and the lifespan of the key frames. A stable key framekey frame with long lifespan may be considered as an important key frame and thus being determined as a stable key frame. The HMD may transmit the stable key frames to the portable device while transmitting the map data to the portable device. The portable device may determine whether the stable key frames are available according to pre-defined rules. If the stable key frames are available, the portable device may update the map for pose tracking according to the stable key frames. Accordingly, the pose drift between the HMD and the portable device may be reduced, and the map loading time for the portable device may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of pose tracking, adapted to a portable device communicatively connected to a head-mounted display, comprising:

receiving a stable key frame from the head-mounted display;

receiving map data from the head-mounted display;

determining whether the stable key frame is available according to information, wherein the information is obtained from the head-mounted display; and in response to the stable key frame being available, updating a map for the pose tracking according to the stable key frame and the map data.

2. The method according to claim 1, wherein the information comprises a time duration since a last connection between the portable device and the head-mounted display was established, and the step of determining whether the stable key frame is available according to the information comprises:

determining whether the time duration is less than a threshold; and in response to the time duration being less than the threshold, determining the stable key frame is available.

3. The method according to claim 2, wherein the information further comprises a power off record of the head-mounted display, and the step of determining whether the stable key frame is available according to the information further comprises:

determining whether the head-mounted display is powered off during the time duration according to the power off record; and in response to the head-mounted display not being powered off during the time duration, determining the stable key frame is available.

4. The method according to claim 3, wherein the information further comprises a first map identification, and the step of determining whether the stable key frame is available according to the information further comprises:

determining whether the first map identification matches a second map identification of the map; and in response to the first map identification matching the second map identification, determining the stable key frame is available.

5. The method according to claim 1, further comprising:

in response to the stable key frame being not available, updating the map without using the stable key frame.

6. The method according to claim 1, wherein the step of updating the map for the pose tracking according to the stable key frame and the map data comprises:

performing a relocalization according to the stable key frame and the map data and determining whether the relocalization is successful; and in response to the relocalization been successful, updating the map according to the stable key frame and the map data.

7. The method according to claim 6, wherein the step of determining whether the relocalization is successful comprises:

obtaining a pose drift between the stable key frame and a current key frame comprised in the map data, wherein the current key frame is corresponded to the stable key frame;

determining whether the pose drift is less than a threshold; and in response to the pose drift being less than the threshold, determining the relocalization is successful.

8. The method according to claim 1, wherein the step of updating the map for the pose tracking according to the stable key frame and the map data comprises:

updating the map based on simultaneous localization and mapping (SLAM) algorithm.

9. The method according to claim 1, wherein the portable device comprises at least one of an accelerometer and an image capture device.

10. A method of generating a stable key frame for pose tracking, adapted to a head-mounted display, comprising:

capturing a plurality of key frames during a time period, wherein the plurality of key frames are spatially correlated to each other, wherein the plurality of key frames comprises a first key frame;

determining whether the first key frame is stable according to the plurality of key frames;

in response to the first key frame being stable, determining the first key frame as a first stable key frame; and outputting the first stable key frame.

11. The method according to claim 10, wherein the plurality of key frames further comprises a second key frame, and the step of determining whether the first key frame is stable according to the plurality of key frames comprises:

capturing a plurality of first features from the first key frame and capturing a plurality of second features from the second key frame;

detecting a plurality of matching features among the plurality of first features and the plurality of second features; and in response to a number of the plurality of matching features being greater than a threshold, determining the second key frame is similar with the first key frame.

12. The method according to claim 11, wherein the step of determining whether the first key frame is stable according to the plurality of key frames comprises:

in response to a number of key frames similar with the first key frame in the plurality of key frames being greater than a threshold, determining the first key frame is stable.

13. The method according to claim 10, wherein the step of determining the first key frame as the first stable key frame comprises:

in response to a lifespan of the first key frame being greater than a threshold, determining the first key frame as the first stable key frame.

14. The method according claim 10, further comprising:

obtaining a plurality of neighboring key frames of the first stable key frame;

selecting a second key frame from the plurality of neighboring key frames based on a depth first search algorithm;

determining whether the second key frame is stable;

in response to the second key frame being stable, determining the second key frame as a second stable key frame; and outputting the second stable key frame.

15. The method according to claim 10, further comprising:

capturing a reference key frame;

obtaining a plurality of neighboring key frames of the reference key frame;

selecting the first key frame from the plurality of neighboring key frames based on a depth first search algorithm; and determining whether the first key frame is stable.

16. A portable device, comprising:

a transceiver, communicatively connecting to a head-mounted display; and a processor, coupled to the transceiver, wherein the processor is configured to:

receive a stable key frame from the head-mounted display;

receive map data from the head-mounted display;

determine whether the stable key frame is available according to information, wherein the information is obtained from the head-mounted display; and in response to the stable key frame being available, update a map for the pose tracking according to the stable key frame and the map data.

17. A head-mounted display, comprising:

a transceiver; and a processor, coupled to the transceiver, wherein the processor is configured to:

capture a plurality of key frames during a time period, wherein the plurality of key frames are spatially correlated to each other, wherein the plurality of key frames comprises a first key frame;

determine whether the first key frame is stable according to the plurality of key frames;

in response to the first key frame being stable, determine the first key frame as a first stable key frame; and output the first stable key frame via the transceiver.

\* \* \* \* \*